United States Patent [19]
Pierce

[11] 4,070,423
[45] Jan. 24, 1978

[54] APPARATUS FOR DIFFUSION IN BODIES OF LIQUID

[76] Inventor: Roger C. Pierce, 521 S. Washington St., Dillon, Mont. 59725

[21] Appl. No.: 494,550

[22] Filed: Aug. 5, 1974

[51] Int. Cl.² .............................................. B01F 3/04
[52] U.S. Cl. ................................ 261/77; 210/221 P; 210/242 A; 261/120; 261/122; 261/123
[58] Field of Search ................. 261/77, 120, 122, 124, 261/91, 92, 119 R, 123; 210/169, 220, 242 R, 242 A, 7, 221 P

[56] References Cited

U.S. PATENT DOCUMENTS

| | | | |
|---|---|---|---|
| 1,550,057 | 8/1925 | Beeler | 261/120 |
| 3,193,260 | 7/1965 | Lamb | 261/120 X |
| 3,218,042 | 11/1965 | Ciabattari et al. | 261/120 X |
| 3,242,071 | 3/1966 | Walker | 261/77 X |
| 3,415,378 | 12/1968 | Fukuda | 210/220 X |
| 3,503,593 | 3/1970 | Nelson | 261/93 X |
| 3,515,375 | 6/1970 | Roos | 261/92 X |
| 3,521,864 | 7/1970 | Welles, Jr. | 261/77 |
| 3,547,811 | 12/1970 | McWhirter | 210/7 |
| 3,572,658 | 3/1971 | Ravitts | 261/120 X |
| 3,620,512 | 11/1971 | Muskat et al. | 261/120 X |
| 3,630,498 | 12/1971 | Bielinski | 261/120 X |
| 3,720,318 | 3/1973 | Cohen | 210/169 |
| 3,722,679 | 3/1973 | Logue | 261/123 X |
| 3,758,083 | 9/1973 | Palmer | 261/120 X |
| 3,794,303 | 2/1974 | Hirshon | 261/120 X |
| 3,846,516 | 11/1974 | Carlson | 261/120 X |
| 3,855,367 | 12/1974 | Webb | 261/120 X |
| 3,865,909 | 2/1975 | Cramer, Jr. | 261/120 X |

*Primary Examiner*—Tim R. Miles
*Assistant Examiner*—Richard L. Chiesa
*Attorney, Agent, or Firm*—Woodard, Weikart, Emhardt & Naughton

[57] ABSTRACT

Apparatus and method for the diffusion of less dense matter into a body of liquid. A floatation module is positioned upon the surface of the body of liquid and a draft tube is attached to the module extending below the module with the top end of the draft tube being spaced apart from the lower surface of the module. A feed line coupled from a source of less dense matter, such as compressed air, extends through the draft tube to the bottom of the draft tube terminating in a diffuser. The insertion and diffusion of the air into the liquid in the draft tube results in a draft action moving the liquid upward through the draft tube until it is deflected outward beneath the floatation module on the underside of the module.

4 Claims, 2 Drawing Figures

APPARATUS FOR DIFFUSION IN BODIES OF LIQUID

BACKGROUND OF THE INVENTION

The invention is generally in the field of a gas and liquid contact apparatus with a gas inlet and outlet.

In the past, various methods and apparatus have been used to aerate a body of liquid, such as a lagoon of water and waste material. Such apparatus often includes means for introducing bacteria or chemicals into the water as well as aeration. A typical approach has been to employ mechanical impellers within the liquid to discharge the liquid into the atmosphere, whereupon the discharged liquid falls back into the body of liquid. A drawback to this approach is that discharging the water into cold air has a cooling effect on the water which slows the desired aerobic bacteria action severely.

Another approach has been to employ mechanical pumping apparatus located within the body of liquid to pump liquid from a given depth or location through an intermediate aerating step and thence to another level or location in the body of liquid. Such a mechanical apparatus suffers from the drawback that in case of a power failure in cold weather, the working parts of the pump or impeller may become frozen, plus the general wearing and damaging effects of the pump and impeller being in contact with the liquid.

Fixed position diffuser elements may be mounted within the body of liquid to aerate or otherwise treat the liquid, but such fixed positioned diffusers are difficult to repalce or clean and therefore a good diffuser nozzle cannot be used on this type of system because of service problems; therefore, the nozzles are large and don't give an economical oxygen transfer.

According to an embodiment of the present invention, a floating draft tube aerator is provided which utilizes compressed air diffusion beneath the surface of the liquid but in conjunction with a movable apparatus having an accessible diffuser nozzle. The air compressors for such apparatus can be housed on shore out of the weather and not exposed to the elements or corrosive liquids as are mechanical aerators. Compressors of the type used in this application are simple in design, easy to repair and normally of long life.

The present floating draft tube aerator eliminates the need for installation of tubes or airlines in muddy bottoms of lagoons, etc. The present aerator also eliminates the possibility of error in computing the required amount of air as can occur in bottom installed systems, due to the fact that the presently disclosed floating units can easily be moved to close or open the diffuser pattern, as oxygen demands dictate. Additional units can be added for peak loads, such as tourist influx, and can be shut down when not needed, by using separate compressors for a given number of aerators. The blower compressors used generate their own heat and can be housed on shore out of the weather, without auxiliary heat or the worry of freezeups.

SUMMARY OF THE INVENTION

One embodiment of the present invention is a diffuser apparatus for a body of liquid comprising a module having a lower surface, a draft tube attached to the module and extending below it, a portion of the upper end of the draft tube being spaced apart form the lower suface of the module, a feed line, couplable from a source of matter less dense than the body of liquid, extending into the draft tube, and attaching means for attaching the feed line to the module.

It is an object of the present invention to make an aerator that can be serviced if necessary from the surface of the body of liquid without having to remove underwater airlines or aerator tubes.

It is a further object of the present invention to provide a diffused-air aerator having excellent diffusion characteristics without the cooling effects of discharging liquid into the atmosphere.

Further objects and advantages of the present invention shall be apparent from the following detailed description and accompanying figures.

DESCRIPTION OF THE PREFERRED EMBODIMENT

Figure 1:
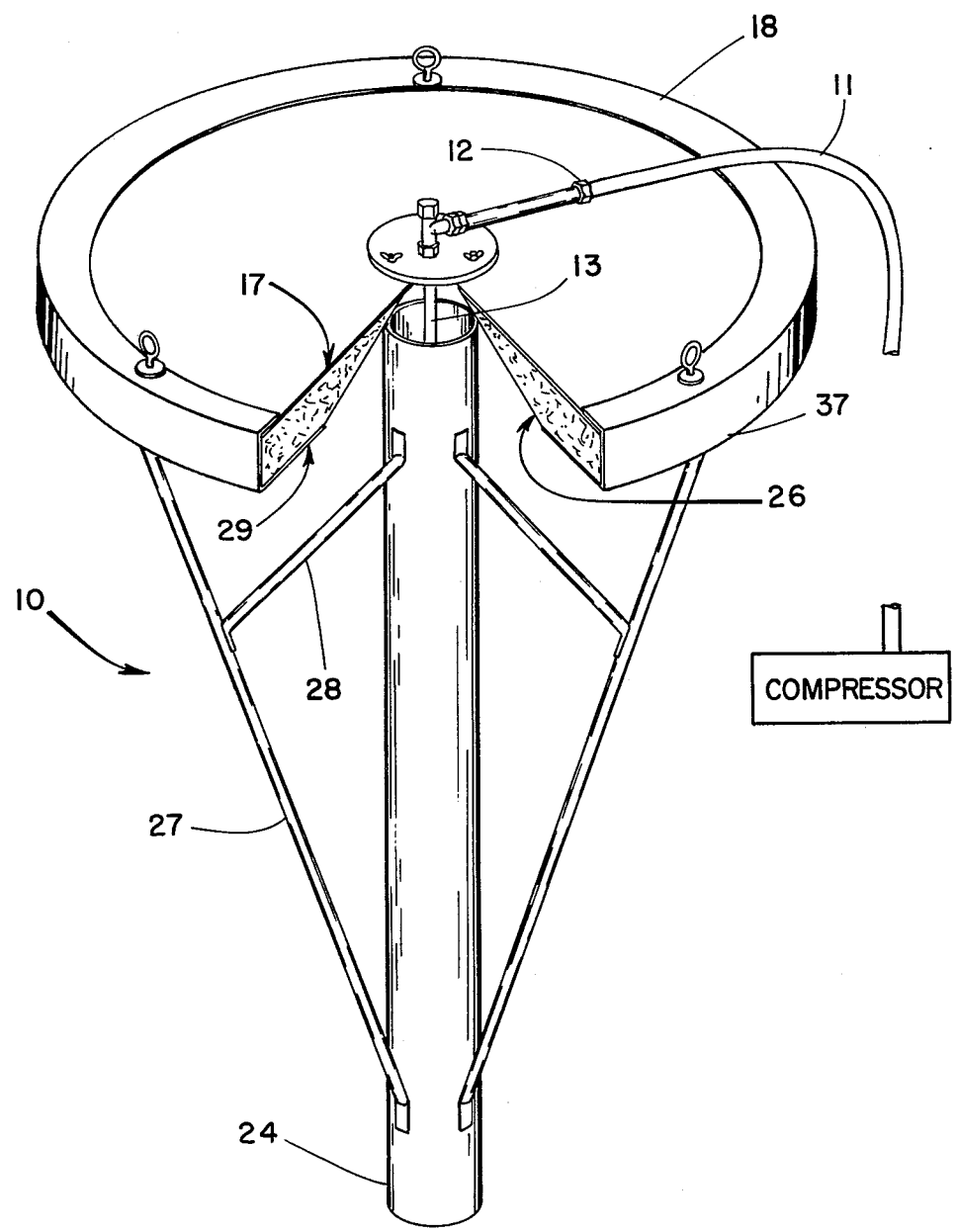
FIG. 1 is a perspective view of an embodiment of the present invention with a portion removed.
Figure 2:
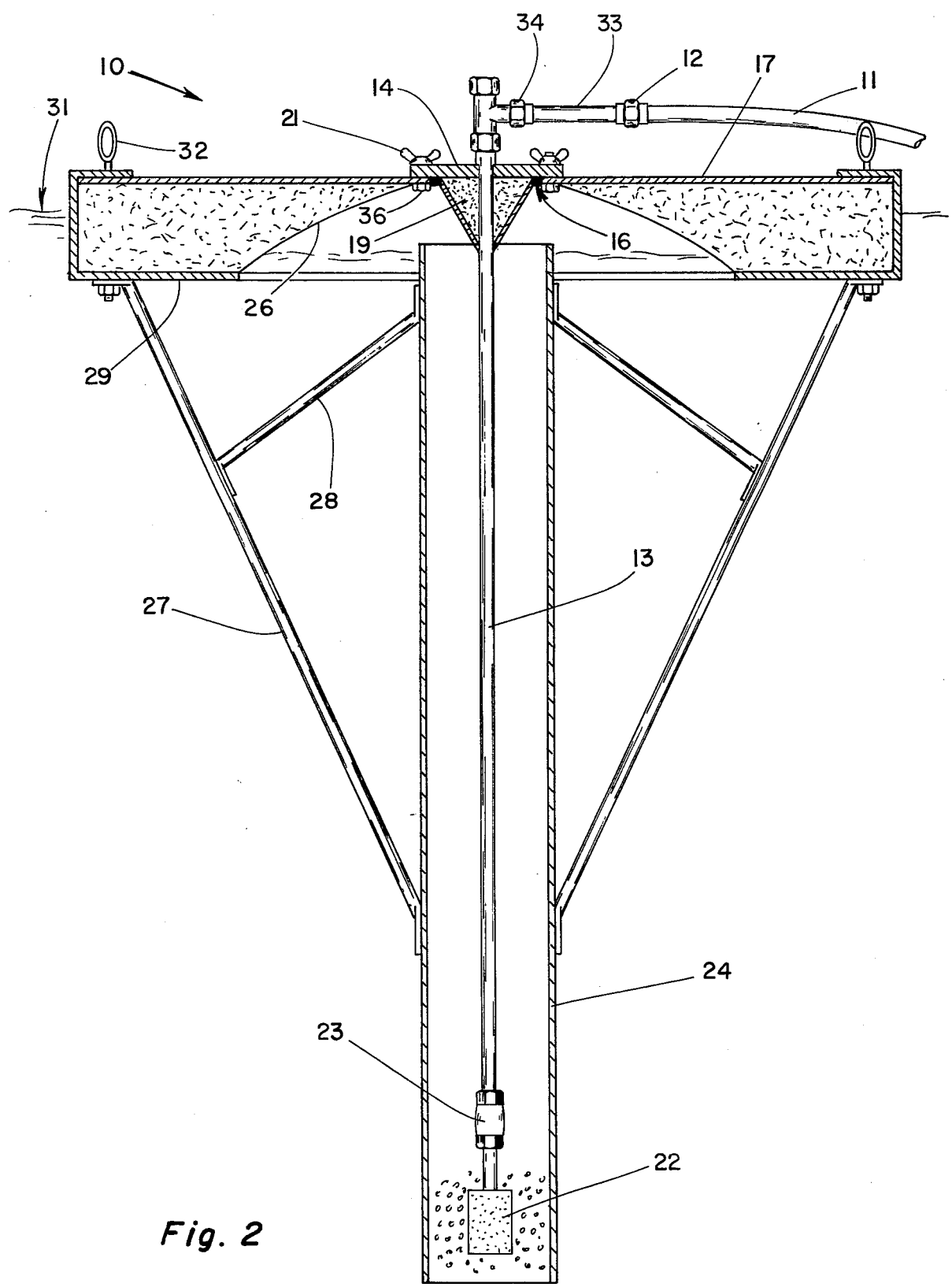
FIG. 2 is a cross-sectional side view of the embodiment of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alternations and further modifications in the illustrated device, and such further applications of the principles of the invention as illustrated therein being contemplated as would normally occur to one skilled in the art to which the invention relates.

Referring now in particular to the figures, there is shown an aerator apparatus 10 for a lagoon according to the present invention. Air line 11 is connected at one end to an air compressor located on the shore adjacent the lagoon, and the other end of air line 11 terminates at a connector 12. Connector 12 makes an airtight connection through member 33 and connector 34 between air line 11 and the top portion of feed line 13. Feed line 13 extends below the surface of the liquid in the lagoon. The upper portion of feed line 13 is rigidly mounted within removable cover plate assembly 14 which includes conical plug portion 16, seated in a central, circular opening in top surface 17 of diffuser dome 18. Plug portion 16 is formed by a metal cone filled with polyfoam 19 which extends downwardly and encircles, and is sealed to, the air feed line 13. Nuts 36 and bolts 21 are used to attach the air line assembly to the top surface 17 of floatation module 18 as shown. Nuts 36 are integral with the underside of surface 17.

The lower end of feed line 13 terminates in air diffuser 22, which is oriented to direct the compressed air in an essentially horizontal direction, about a 360° arc, against the sidewall of draft tube 24. Within feed line 13 above air diffuser 22 is check valve 23 operable to permit air to move through feed line 13 and out through diffuser 22 but to close if the air compressor ceases functioning and water attempts to flow up feed line 13 through diffuser 22.

Draft tube 24 is a rigid plastic pipe which may alternatively be constructed of aluminum, fiberglass or some other metal. Draft tube 24 is spaced apart from the lower or diffuser dome surface 26 of floatation module 18. Four support struts 27 are disposed at 90° intervals around draft tube 24 and floatation module 18. One end of each strut 27 is welded or cemented to draft tube 24 and the other end is similarly rigidly attached to lower surface 29 of floatation module 18. The manner of attachment is conventional depending upon the materials used. An auxiliary strut 28 for support is provided for each main strut 27, and strut 28 is rigidly attached at one end to the strut 27 and at the other end to the wall of draft tube 24.

Floatation module 18 includes a top surface 17, lower wall 29 and side wall 37. Within the annular compartment formed by walls 17, 29 and 37, there is contained a polyform or other floatation material to provide sufficient buoyancy to aerator assembly 10 to maintain it partially above top surface 31 of the liquid in the lagoon. As an alternative, the compartment formed by walls 17, 29 and 37 may be sealed and contain air or other gas to provide the necessary buoyancy for the aerator 10.

As can be seen, the inner portions of lower surface 29 are concave forming a diffuser dome surface 26, which provides an interior "air pocket" above surface 31 of the liquid in the lagoon.

Loop 32 is provided attached to top wall 17 of floatation module 18 for the attachment of a suitable anchor to maintain the aerator apparatus at a desired point in the lagoon, and additional anchors may be attached to the air line 11 so that air line 11 is submerged below the liquid surface, thereby permitting some heat transfer from the air line to the liquid, enhancing bacterial action. Air mixed with liquid at the bottom of the draft tube 24 in the vicinity of diffuser 22 causes the liquid in draft tube 24 to rise, moving the liquid to the surface beneath diffuser dome 26. As the draft tube directs the movement of aerated liquid into the dome, the liquid and air are again mixed and directed down into the main body of liquid of the lagoon by dome surface 26.

In the embodiment shown, there is a floatation dome 18 having a diameter of four feet in order to support and properly diffuse the air. A typical size draft tube 24 for this apparatus would have a diameter of 6 or 8 inches. The length of the draft tube and feed line 13 are dependent upon the depth of the lagoon or other body of liquid to be aerated keeping in mind that the deeper the diffuser in the water, within reason, the better the oxygen transfer because the water pressure increases with depth and the increased water pressure causes a better oxygen transfer by creating finer bubbles. As a further function of draft tube 24, the inner wall of the draft tube acts as a diffuser when the air mixed with water strikes the inside wall of the draft tube.

The number of units utilized to aerate a particular body of liquid may be chosen by the user and changed as needs require, and, as suggested above, certain of the units may be selectively activated or deactivated depending upon seasonal or other varying needs. It can also be seen that in case the liquid causes calcification in the diffuser nozzle 22, or if for any reason it is desired to change the diffuser nozzle, the bolts 21 may be loosened and removed so that air line assembly 14 and feed line 13 may be entirely removed from within draft tube 24 and diffuser nozzle 22 may be removed and replaced with a new nozzle.

The embodiment discussed herein has dealt with aerating water in a lagoon with air, but it can be seen that other liquids may be aerated and the aeration may be done with gases other than air. With the appropriate selection of a diffuser nozzle, other matter may be introuced into the body of liquid, using the apparatus essentially as shown, with the condition that at least a portion of the matter introduced through feed line 13 and nozzle 22 be less dense than the liquid in the body of liquid so that the mixing action and draft action of the draft tube may be obtained in coordination with the deflection of the rising liquid off the diffuser dome 26.

While there have been described above the principles of this invention in connection with specific apparatus, it is to be clearly understood that this description is made only by way of example and not as a limitation in the scope of the invention.

What is claimed is:

1. A floating aerator for a sewage lagoon or the like, said aerator comprising a floating diffuser dome of generally disc-shaped configuration and having a closed upper face disposed above the liquid level of the lagoon, said dome having an underface which is concave over a central portion of its total surface area and of flat planar configuration over the marginal area, said marginal surface area being below said liquid level and encircling said concave surface portion, said concave surface thus providing a trapped air pocket under said dome, a draft tube supported by said dome and depending vertically below the center of said concave portion of the dome surface with the upper end of the draft tube spaced therefrom, and an air supply tube accessible from the outer surface of said dome and extending through said draft tube to terminate at a diffuser adjacent the draft tube's lower end, whereby the upper flow of the air-liquid mixture induced in the draft tube by the injection of air through the diffuser initially impacts on said concave surface portion then flows radially outwardly along said planar marginal surface of the dome.

2. A floating aerator as claimed in claim 1 in which said air supply tube extends through said diffuser dome to a detachable connection with a source of air under pressure.

3. A floating aerator as claimed in claim 1 in which a conical member depends from the center of said concave surface portion of the underface of the dome, the apex of said conical member being adjacent the upper end of said draft tube.

4. A floating aerator as claimed in claim 1 in which the upper face of said dome has a center port closed by a removeable cover plate, said port when uncovered permitting access to the interior of said draft tube.

* * * * *